US008011620B2

(12) United States Patent
Guptaa et al.

(10) Patent No.: US 8,011,620 B2
(45) Date of Patent: Sep. 6, 2011

(54) FUEL PICKUP WITH WICKING MATERIAL

(75) Inventors: Suneal Guptaa, Salisbury, MD (US); R. Michael Guterres, Reisterstown, MD (US); Dominic J. Palumbo, Cockeysville, MD (US); Ron Stahl, Reisterstown, MD (US)

(73) Assignee: AAI Corporation, Hunt Valley, MD (US)

( * ) Notice: Subject to any disclaimer, the term of this patent is extended or adjusted under 35 U.S.C. 154(b) by 844 days.

(21) Appl. No.: 11/984,387

(22) Filed: Nov. 16, 2007

(65) Prior Publication Data

US 2009/0200429 A1 Aug. 13, 2009

Related U.S. Application Data

(60) Provisional application No. 60/859,243, filed on Nov. 16, 2006.

(51) Int. Cl.
*B64D 37/06* (2006.01)

(52) U.S. Cl. ................. 244/135 B; 244/135 R; 141/110

(58) Field of Classification Search .............. 244/135 R, 244/135 B; 220/722, 905, 588, 589–591, 220/62.19; 141/110; 137/592, 590
See application file for complete search history.

(56) References Cited

U.S. PATENT DOCUMENTS 2,609,118 A 9/1952 Cattaneo
2,719,583 A 10/1955 Malick
2,788,125 A * 4/1957 Webb ......................... 210/172.4
3,246,766 A * 4/1966 Pall ............................... 210/457
3,561,414 A 2/1971 Schou
3,826,372 A * 7/1974 Bell ........................... 210/172.4
4,645,600 A * 2/1987 Filippi ....................... 210/416.4
4,961,850 A * 10/1990 Combest ....................... 210/232
5,409,608 A * 4/1995 Yoshida et al. ............... 210/315
5,787,865 A 8/1998 Harris et al.
6,230,558 B1 5/2001 Miwa et al.
6,386,222 B1 5/2002 Harris
6,447,945 B1 9/2002 Streckert et al.
6,579,090 B1 6/2003 Taubitz et al.
6,795,598 B1 9/2004 Devenyi
2002/0189707 A1 12/2002 Enge
2005/0279406 A1 12/2005 Atwood et al.
2006/0006108 A1 1/2006 Arias et al.
2006/0046123 A1 3/2006 Guo et al.

FOREIGN PATENT DOCUMENTS

WO WO-2006/010012 1/2006

OTHER PUBLICATIONS http://www.asahi-kasei.co.jp/sarannet/en/seihin_saranfilter02.html.*
International Search Report.

* cited by examiner

*Primary Examiner* — Joshua J Michener
(74) *Attorney, Agent, or Firm* — Venable LLP; Jeffri A. Kaminski; Steven J. Schwarz

(57) ABSTRACT

A fuel pickup includes a fuel pickup tube having a plurality of holes for receiving fuel from inside a fuel container; and a wicking material enveloping at least one of the plurality of holes. Aircraft fuel systems including a fuel pickup comprising a wicking material are also disclosed.

18 Claims, 8 Drawing Sheets

Fuel Volume Remaining At First Engine Kill
(Fuel Bladder At +10° Roll)

FUEL PICKUP WITH WICKING MATERIAL

CROSS-REFERENCE TO RELATED APPLICATIONS

This patent application claims priority under 35 U.S.C. §119 of U.S. Provisional Patent Application No. 60/859,243, filed on Nov. 16, 2006, the entire content of which is incorporated herein by reference.

TECHNICAL FIELD

This patent application relates generally to a fuel pickup for use, for example, in a fuel bladder located in a wing of an unmanned aerial vehicle (UAV).

BACKGROUND

UAVs and other aircraft typically include a fuel system that includes a fuel bladder for holding fuel. The fuel bladder can be located, for example, within the hollow wings of the UAV. The fuel system also typically includes one or more fuel pickups located within the bladder. The fuel pickup transports the fuel inside the bladder to transfer lines located outside of the bladder. The transfer lines transfer the fuel to downstream components, such as a fuel pump, fuel filter, or sump, and the fuel is ultimately delivered to an engine.

As the engine consumes the fuel contained in the fuel bladder, the air/fuel ratio inside the bladder increases. As the air/fuel ratio reaches high levels (e.g., greater than 1:1), the chances of air or fuel vapor ingestion increases. Vaporized fuel in the system can result, for example, from vaporized fuel present in a closed fuel system. Air can enter the fuel system, for example, due to improper fueling procedures, or leaking fuel line connections or fittings.

When the engine ingests air or fuel vapor, it typically stalls. With conventional fuel pickups, the engine often stalls due to air and/or fuel vapor ingestion prior to consumption of all of the fuel contained in the fuel bladder. As a result, the run time of the engine is unduly shortened.

SUMMARY

Embodiments of the invention may use the capillary transport properties of a wicking material to increase the amount of fuel that can be reliably drawn by a fuel pickup prior to engine seizure or fuel starvation, even in the presence of excessive ratios of air to fuel (e.g., greater than 1:1), and despite variations in temperature, altitude, and orientation. The wicking material can be associated with the fuel pickup and can have numerous microporous conduits that extend within a fuel container. For example, in the case of a fuel bladder located within the wing of an UAV, the fuel bladder and the wicking material located therein can extend across nearly the entire span and chord of the wing. The wicking material expands the accessible fuel region within the bladder to nearly any location within the bladder that the wicking material contacts. As a result, the proportion of fuel within the bladder that is consumed prior to engine seizure or fuel starvation is increased.

According to an exemplary embodiment, a fuel pickup may include a fuel pickup tube including a plurality of holes for receiving fuel from inside a fuel container; and a wicking material enveloping at least one of the plurality of holes.

According to another exemplary embodiment, an aircraft fuel system may include a fuel container; a fuel pickup tube located in the fuel container; and a wicking material located in the fuel container and contacting at least a portion of the fuel pickup tube.

According to yet another exemplary embodiment, an aircraft fuel system may include an aircraft wing defining a hollow interior; a fuel container located in the hollow interior; and a fuel pickup located in the fuel container, the fuel pickup comprising a wicking material.

Further objectives and advantages, as well as the structure and function of illustrative embodiments, will become apparent from a consideration of the description and drawings.

BRIEF DESCRIPTION OF THE DRAWINGS

The foregoing and other features and advantages of the invention will be apparent from the following, more particular description, as illustrated in the accompanying drawings wherein like reference numbers generally indicate identical, functionally similar, and/or structurally similar elements.

DETAILED DESCRIPTION

Various exemplary embodiments of the invention are discussed in detail below. In describing embodiments, specific terminology is employed for the sake of clarity. However, the invention is not intended to be limited to the specific terminology so selected. While specific embodiments are discussed, it should be understood that this is done for illustration purposes only. A person skilled in the relevant art will recognize that other components and configurations can be used without departing from the spirit and scope of the invention.

Figure 1:
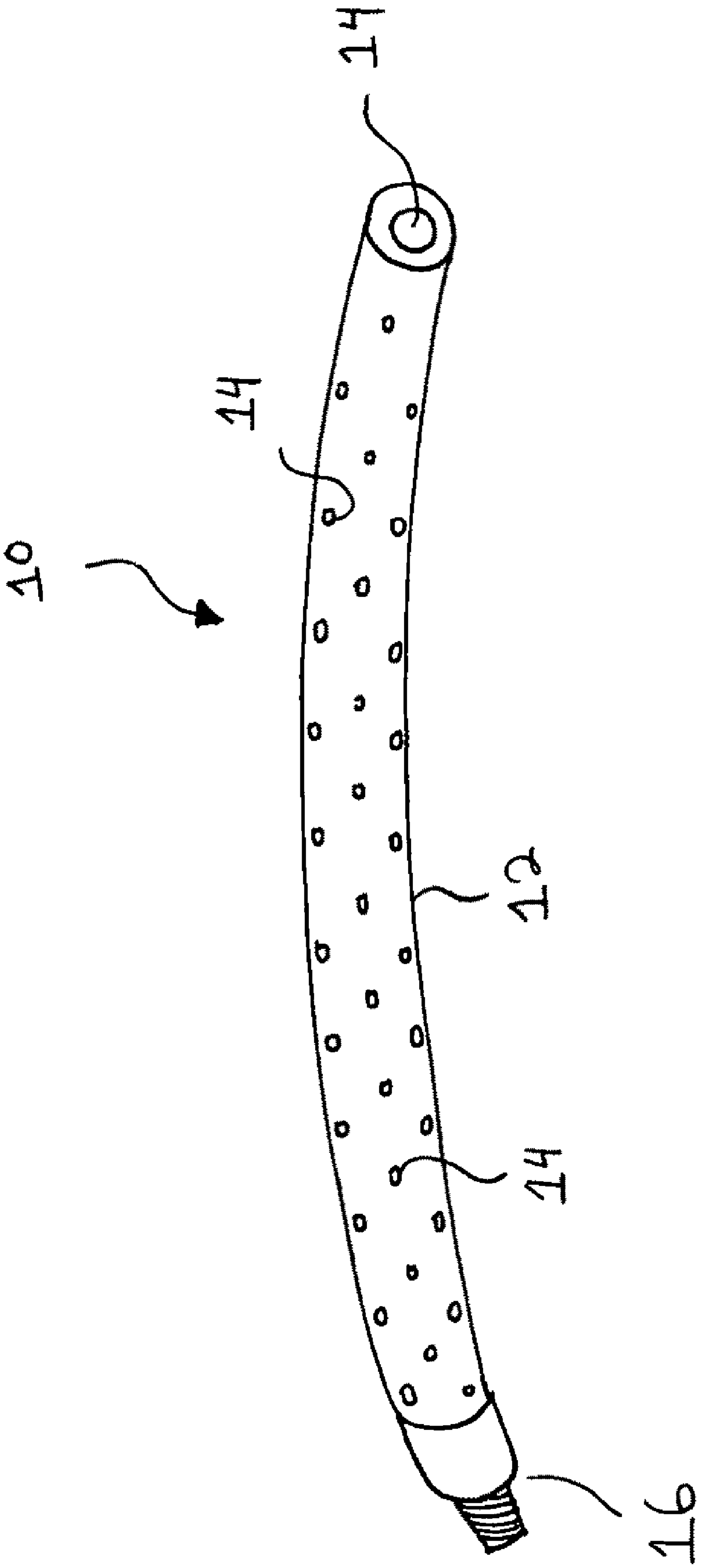
FIG. 1 is a perspective view of an exemplary fuel pickup.
Figure 5:
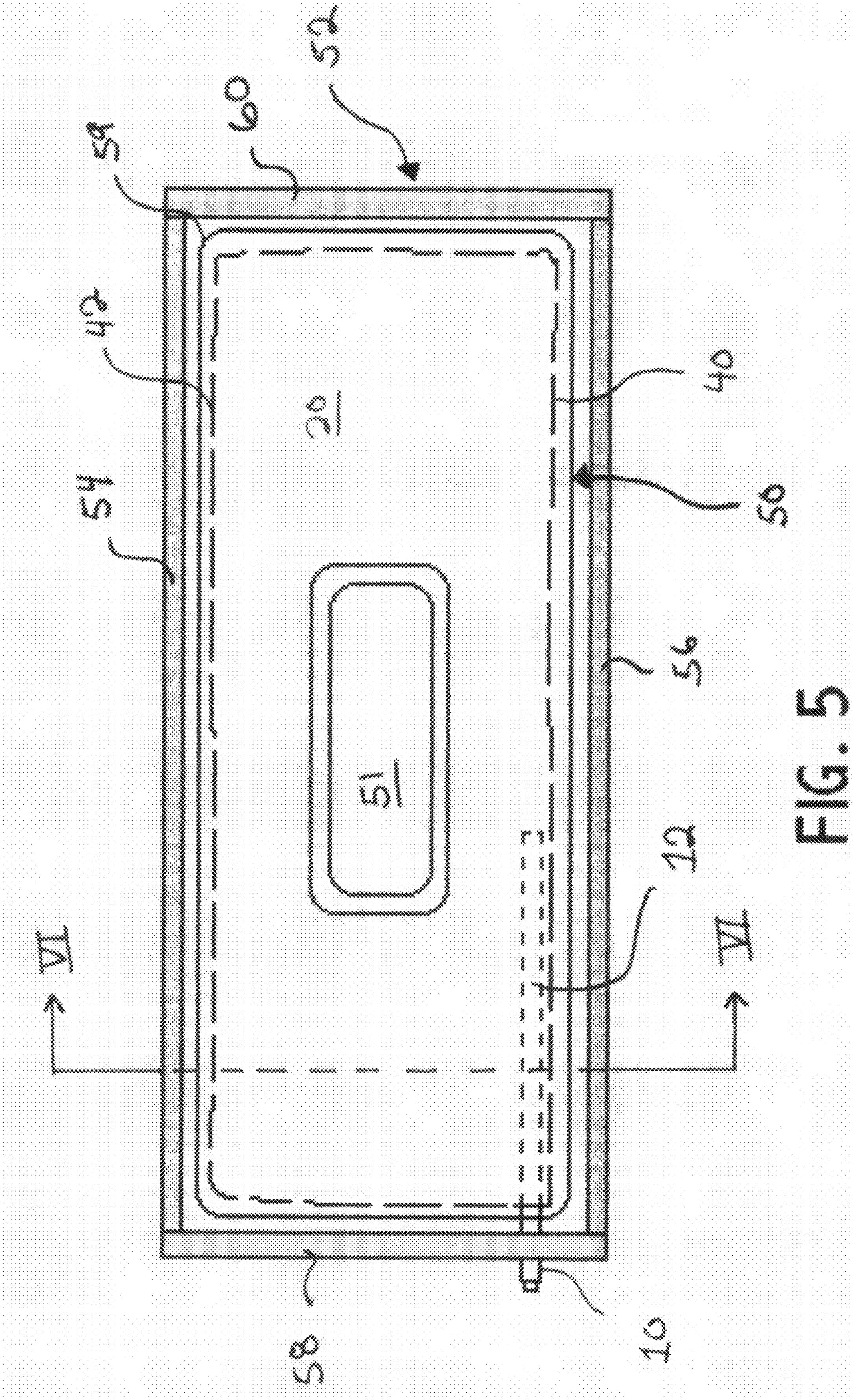
FIG. 5 is a top, schematic representation of an exemplary aircraft wing enclosing a fuel bladder in conjunction with a fuel pickup tube and wicking material, wherein the wing is shown with its top sheet removed to permit viewing of components inside the wing.

Referring to FIG. 1, an exemplary fuel pickup tube is shown generally as reference number 10. Fuel pickup tube 10 may be of the type typically referred to in the art as a “piccolo tube,” although other configurations are possible. As shown in FIG. 1, fuel pickup tube 10 can comprise an elongated section of tubing 12 including one or more openings 14 for taking up fuel, for example, from a fuel container. The openings 14 may be of various shapes and sizes, and may be located along the length of the tubing 12, as well as at the terminal end of the tubing 12. As also shown in FIG. 1, fuel pickup tube 10 can include a fitting 16 located at one end, for example, a threaded connector or a quick-connector. Fitting 16 can connect fuel pickup tube 10 to downstream hoses, etc., to facilitate fuel delivery, for example, to an aircraft engine. According to an exemplary embodiment, fuel pickup tube 10 may include, in an exemplary embodiment, a RQ-7B piccolo tube having a length of approximately 35 inches, an outer diameter of approximately ⅛ to ½ inches, and holes spaced approximately 2 to 3 inches apart, although other configurations are possible. As shown in FIG. 5, for example, and discussed in more detail below, pickup tube 10 can be located within a fuel container 50 that may be located, for example, in the wing of an aircraft, such as a UAV. Fuel pickup tube 10 is not limited to the circular and/or oval cross-sectional shape and configuration shown. For example, fuel pickup tube 10 can alternatively have a square, triangular, polygonal, or other cross-section. Additionally or alternatively, fuel pickup tube 10 can be curved or bent. Fuel pickup tube 10 can be flexible or rigid.

Figure 3A:
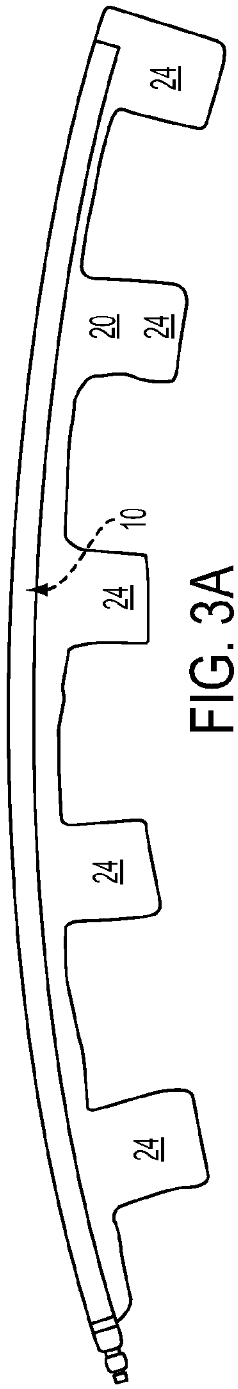
FIGS. 3A-3C are top views of three exemplary embodiments of a fuel pickup tube wrapped in a wicking material.
Figure 3B:
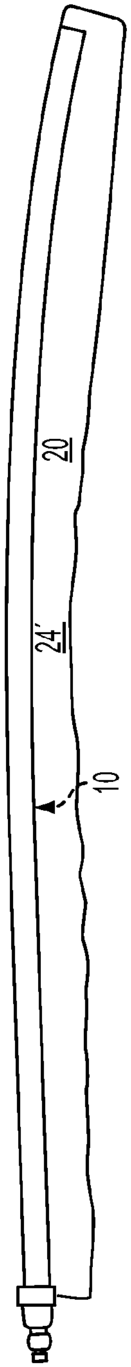
Figure 3C:
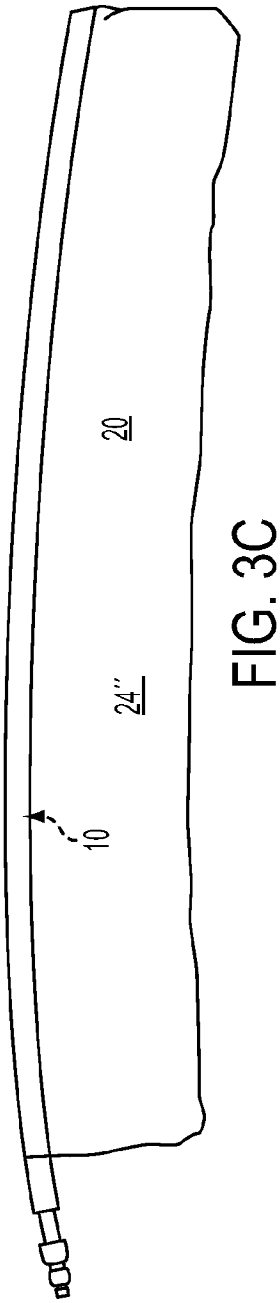
Figure 4:
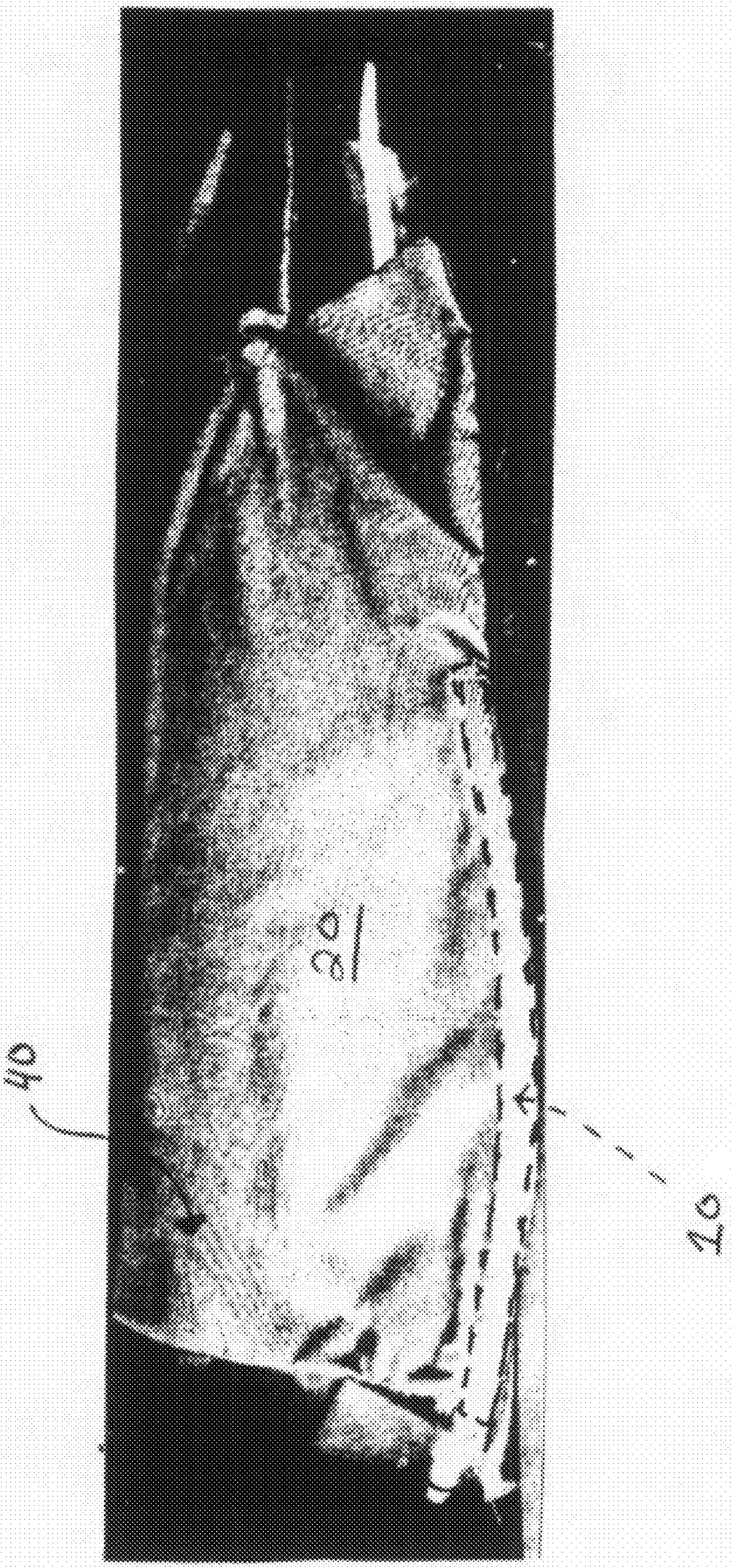
FIG. 4 is a perspective view of an exemplary embodiment of a fuel pickup tube attached to a wicking material.

Referring generally to FIGS. 2-4, a wicking material 20 can be associated with fuel pickup tube 10, for example, to increase the amount of fuel that can be reliably drawn up by an engine connected to the fuel pickup tube 10 prior to engine seizure or fuel starvation. The fuel pickup tube 10 can exploit the capillary transport abilities of the wicking material 20 (e.g., both in static equilibrium and across a pressure gradient), to increase the fuel uptake. Exemplary materials suitable for the wicking material 20 include materials that wick liquids against a gravity potential when standing upright. This capillary wicking capacity allows the materials to exploit a pressure gradient across their surface to enhance the delivery of fuel to downstream fuel transfer lines.

According to an exemplary embodiment, the wicking material 20 can have a vinyl composition, and/or can have a microporous molecular structure. The microporous molecular structure can act as conduits to take up fuel across substantially the entire area of the wicking material 20, thereby expanding the accessible fuel region with a fuel container to nearly any location the wicking material 20 contacts. According to an exemplary embodiment, the wicking material 20 may comprise a saran-based fabric, such as, for example, but not limited to NF-900 Saran-Fabric from Asahi-Kasei America Inc. of New York, N.Y., USA.

Figures 2A, 2B, 2C:
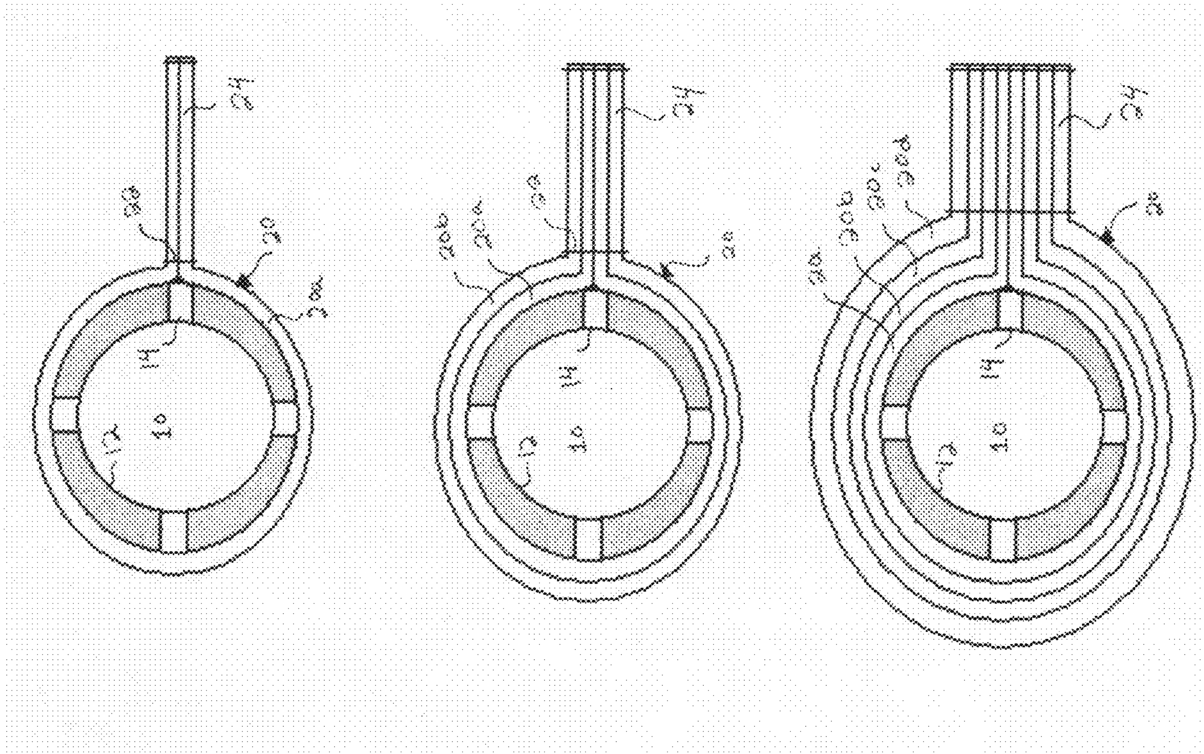
FIGS. 2A-2C depict exemplary embodiments of a fuel pickup tube wrapped in a wicking material, shown schematically and in cross-section.

Referring to the exemplary embodiments of FIGS. 2A-2C, the wicking material 20 can be wrapped tightly around the tubular portion 12 of fuel pickup tube 10, for example, such that the wicking material 20 may conform closely to the outer circumference of the tubular portion 12. As shown in the exemplary embodiment of FIG. 2A, a single layer 20*a* of the wicking material 20 can be wrapped completely around the tubular portion 12, and joined together, for example, with stitches 22 or other fastening structures known in the art. Alternatively, layer 20*a* can comprise a unitary, tube-shaped piece of the wicking material 20 that is slid over the tubular portion 12 of the fuel pickup tube 10. FIG. 2B is similar to the embodiment of FIG. 2A, except that it may include two layers 20*a*, 20*b* of wicking material 20 wrapped tightly around the fuel pickup tube. FIG. 2C is also similar to the embodiment of FIG. 2A, except that it includes four layers 20*a*, 20*b*, 20*c*, 20*d* of wicking material 20 wrapped tightly around the fuel pickup tube. Layering the wicking material can increase the amount of wetted surface area exposed to fuel, for example, during flight, and can increase the fuel retention and wicking potential of the wicking material 20. As a result, layering the wicking material 20 can increase the fuel uptake properties of the fuel pickup tube 10. Based on the specific configuration of the wicking material 20, and its weight, it is expected that the wicking material may add between about 0.2 and about 1.0 pounds to the weight of a fuel system, according to an exemplary embodiment.

Still referring to FIGS. 2A-C, the one or more layers of wicking material 20 can envelope each of the holes 14 in the tubular portion 12 of the fuel pickup tube, including the hole 14 located in the terminal end of portion 12. For example, as shown, the wicking material 20 can be held tightly over each of the holes 14, such that the wicking material may completely cover each of the holes 14 in a flush manner. As a result, any pressure gradient applied to the fuel pickup tube can create a pressure-gradient across the one or more layers of wicking material 20, thereby maximizing the amount of fuel available to the fuel pickup tube 10 by drawing through each of the one or more layers of wicking material 20. Therefore, the wicking material 20 may prevent vapor or air ingestion into an engine and may mitigate fuel system related mishaps. Additional benefits can include water/fuel separation and/or in-tank fuel filtration. The fuel pickup tube 10 and wicking material 20 can be used with closed-loop fuel systems, and/or electronic fuel injection systems (e.g., to provide air- and vapor-free fuel delivery to injectors). According to an exemplary embodiment, the wicking material 20 and/or fuel pickup tube 10 can be retrofitted to existing fuel systems without substantially affecting their configuration and/or operation. For example, a conventional fuel bladder and fuel pickup may be replaced with one described herein. Alternatively, an entire wing containing a conventional system may be replaced with a wing containing a fuel system described herein.

Still referring to FIGS. 2A-C, the wicking material 20 can include one or more tabs 24 extending along the length of the tubular portion 12 of the fuel pickup tube 10. The tab(s) 24 can comprise a single layer of material folded over on itself, as shown in FIG. 2A, or alternatively, can comprise multiple layers of material folded over upon themselves, as shown in FIGS. 2B and 2C. The tab(s) 24 can extend away from the tubular portion 12 in a radial direction, as shown. The tab(s) 24 can be formed integrally with the one or more layers of wicking material 20, as shown in FIGS. 2A-C, or alternatively, can comprise separate pieces of material attached, for example, by sewing. The tab(s) 24 can act as outward extensions of the wicking material 20 that increase the reach and/or fuel-retention of the wicking material 20 during flight maneuvers, for example, where fuel location is subject to change.

Referring to FIGS. 3A-3C, three exemplary configurations of tab(s) 24 are shown in top view. The exemplary embodiment in FIG. 3A may include five intermittent tabs 24 extending along the length of the tubular portion 12 of the fuel pickup tube 10. The tabs 24 are generally evenly spaced apart, and have open spaces located between adjacent tabs 24. The tabbed configuration can allow for wicking of fuel from substantially the entire bladder, while at the same time reducing the volume and weight of the wicking material 20. Reducing the volume of the wicking material 20 can allow for more fuel to be contained in the bladder. Reducing the weight of the wicking material 20 can reduce the overall weight of the fuel system or aircraft. According to an exemplary embodiment, the tabs 24 are approximately two inches wide, extend approximately three inches away from the tubular portion in the radial direction, and are spaced approximately four inches apart from one another. The wicking material 20 in the embodiment of FIG. 3A includes two layers 20*a*, 20*b* of wicking material 20 (see FIG. 2B), however, other configurations are possible.

The exemplary embodiments of fuel pickups shown in FIGS. 3B and 3C each may include a single, uninterrupted tab 24', 24", respectively, that may extend along the length of the tubular portion 12. The embodiment in the FIG. 3B includes a relatively thin tab 24' of wicking material 20 (e.g., 1 to 2" across). The embodiment in FIG. 3B also includes four layers 20-20*d* of wicking material 20 (see FIG. 2C), although other configurations are possible. The configuration in FIG. 3C includes a relatively wide tab 24" (e.g., 4" across) and includes a single layer 20*a* of wicking material 20 (see FIG. 2A), although other configurations are possible. In all three exemplary embodiments shown in FIGS. 3A-3C, the wicking material 20 covers the entire length of the tubular portion 12 of fuel pickup tube 10, including the hole 14 located at the terminal end of tubular portion 12.

Referring to FIG. 4, another exemplary embodiment of the wicking material 20 is shown. According to this embodiment, one or more layers of the wicking material 20 are formed into a bag 40, and all or part of the tubular portion 20 of the fuel pickup tube 10 extends into the bag 40, for example, through an appropriately shaped hole in the wicking material 20. A portion of the wicking material 20 can be wrapped tightly around all or a part of the tubular portion 12, for example, similar to the exemplary embodiments of FIGS. 2 and 3A-3C. Alternatively, all or a portion of the tubular portion 12 can be positioned freely within the bag 40 (e.g., not rigidly connected to the wicking material). According to another exemplary embodiment, the wicking material 20 can be used in place of the tubular portion 12. For example, a truncated tubular portion 12 can abut the bag 40 at its perimeter (e.g., along an edge), and extend only slightly into the bag 40, for example, by approximately ½ to 2 inches, or alternatively, not extend into the bag 40 at all.

Figure 6:
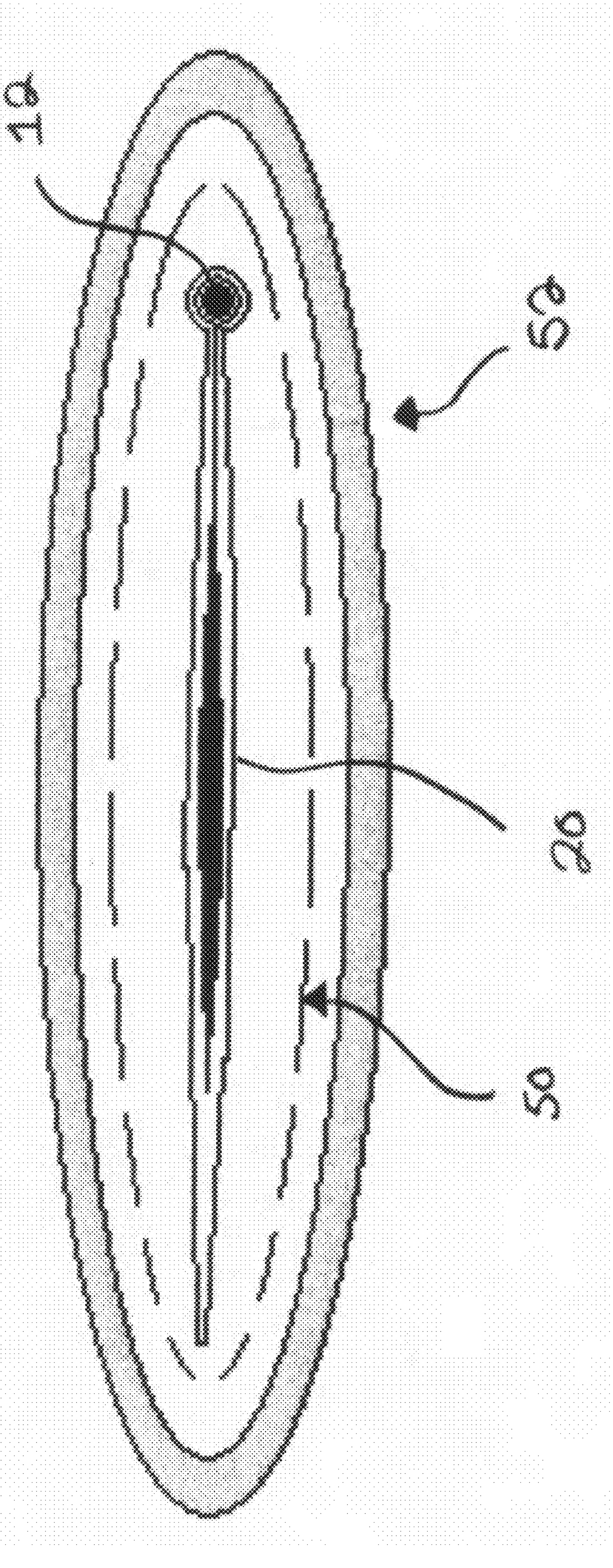
FIG. 6 is a schematic, cross-sectional view of FIG. 5, taken along lines VI-VI of FIG. 5.

Referring to FIGS. 5 and 6, an exemplary aircraft fuel system located with a portion of an aircraft wing 52 is shown. The fuel system may include a fuel container 50, which can comprise a flexible bladder (as shown), or alternatively, a rigid or semi-rigid container. According to an exemplary embodiment, the fuel container 50 can comprise a block 1A bladder supplied by AeroTec Laboratories (ATL) Fuel Bladder of Ramsey, N.J., USA, without baffles, although other configurations are possible.

As shown in FIGS. 5 and 6, the fuel container 50 can be located within an aircraft wing 52, for example, in the hollow region formed between the leading and trailing edges 54, 56, and between ribs 58, 60, although other configurations and arrangements are possible. According to an exemplary embodiment, the size and shape of the fuel container 50 is constrained only by the interior dimensions of the wing. For example, according to an exemplary embodiment, a flexible fuel bladder 50 can extend across nearly the entire span and chord of the wing 52.

The fuel container 50 can contain at least a portion of the fuel pickup tube 10, as well as the wicking material 20. The wicking material 20 can be in any of the exemplary configurations discussed above. In the exemplary embodiment of FIGS. 4 and 5, the wicking material 20 is in the bag-like configuration, according to which embodiment, the bag 40 can define an outer perimeter 42 that is of substantially the same shape and dimensions as the outer perimeter 59 of the fuel container 50, thereby maximizing the area within the fuel container 50 that can be reliably used for fuel uptake. The wicking material 20 can alternatively have the tabbed configurations shown in FIGS. 2 and 3A-C, although, other configurations are also possible, for example, those not including tabs.

As shown in FIG. 5, the fuel container 50 can include an access hatch 51, to provide access to the fuel pickup tube 10 and/or wicking material 20 located inside the fuel container 50. According to an exemplary embodiment, the access hatch is manufactured by ATL Fuel Bladders in New Jersey.

EXAMPLE

Figure 7:
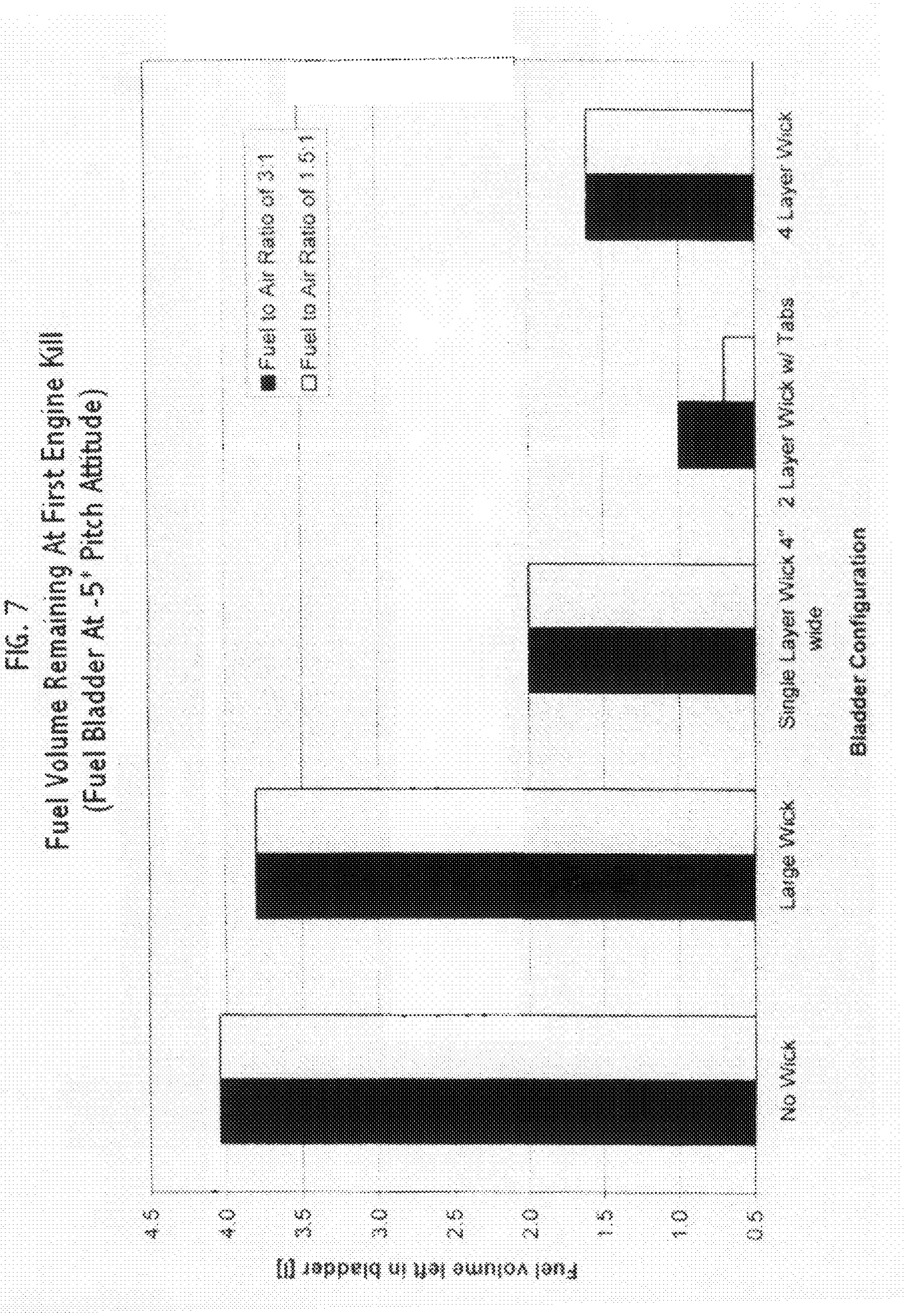
FIG. 7 is a graph indicating the amount of fuel volume remaining in a fuel bladder after first engine shutoff for various exemplary configurations of a fuel pickup, wherein the fuel bladder is oriented at −5° pitch attitude during the engine run.
Figure 8:
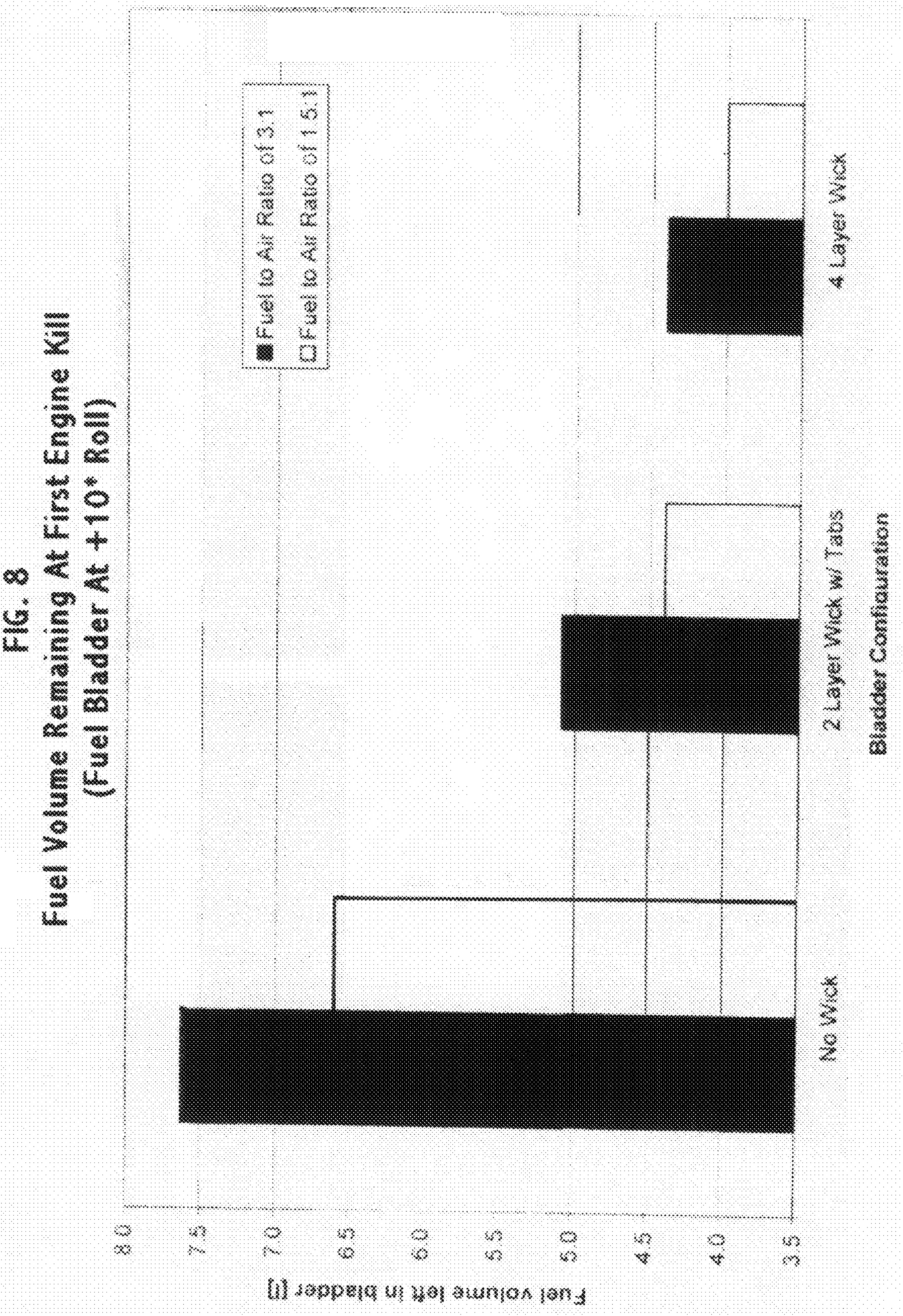
FIG. 8 is a graph indicating the amount of fuel volume remaining in a fuel bladder after first engine shutoff for various exemplary configurations of a fuel pickup, wherein the fuel bladder is oriented at +10° roll during the engine run.

FIGS. 7 and 8 contain graphs depicting the amount of unused fuel remaining in fuel bladders after first engine kill (cutout) for various fuel systems described herein. The tests were run using a fully functional Shadow 200 fuel system with fuel flow metering, supplied by ATL Fuel Bladders of New Jersey. For the tests, the fueling and de-fueling procedure replicated those used in the field for UAVs. The fuel container used in the tests was a Block IA bladder having a volume of approximately 36 Liters, and having no baffles.

FIG. 7 depicts the amount of fuel remaining in the fuel bladder after first engine kill for a fuel bladder oriented at −5° pitch attitude, and at fuel-to-air ratios of 3:1 and 1.5:1 for five different configurations. The first configuration, labeled "no wick," did not include the wicking material described herein, and thus, was a conventional system. For this configuration, approximately 4 liters of unused fuel were left in the bladder after first engine kill, for both 3:1 and 1.5:1 fuel-to-air ratios. The configuration labeled "large wick" included wicking material in the bag-like configuration shown in FIG. 4. For this configuration, approximately 3.8 liters of unused fuel were left in the bladder after first engine kill, for both 3:1 and 1.5:1 fuel-to-air ratios. The configuration labeled "single layer wick 4 "wide" included wicking material in the configuration shown in FIG. 3C, and in FIG. 2A. For this configuration, approximately 2 liters of unused fuel were left in the bladder after first engine kill, for both 3:1 and 1.5:1 fuel-to-air ratios. The configuration labeled "2 layer wick with tabs" included wicking material in the configuration shown in FIG. 3A, and in FIG. 2B. For this configuration, approximately 1 liter of unused fuel was left in the bladder after first engine kill for the 3:1 fuel-to-air ratio, and approximately 0.7 liters of unused fuel were left for the 1.5:1 fuel-to-air ratio. The configuration labeled "4 layer wick" included wicking material in the configuration shown in FIG. 3B, and in FIG. 2C. For this configuration, approximately 1.6 liters of unused fuel were left in the bladder after first engine kill for both the 3:1 and 1.5:1 fuel-to-air ratios. Thus, for a fuel bladder at a −5° pitch attitude, the presence of the wicking material decreased the amount of unused fuel by up to approximately 3 liters, depending on the configuration of the wicking material and/or the fuel-to-air ratio. NF-900 Saran-Fabric was used for all embodiments.

FIG. 8 depicts the amount of fuel remaining in the fuel bladder after first engine kill for a fuel bladder oriented at +10° roll, and at fuel-to-air ratios of 3:1 and 1.5:1 for three different configurations. The first configuration, labeled "no wick," did not include the wicking material described herein. For this configuration, approximately 7.6 liters of unused fuel were left in the bladder after first engine kill for the 3:1 fuel-to-air ratio, and approximately 6.6 liters of unused fuel were left for the 1.5:1 fuel-to-air ratio. The configuration labeled "2 layer wick with tabs" included wicking material in the configuration shown in FIG. 3A, and in FIG. 2B. For this configuration, approximately 5.1 liters of unused fuel were left in the bladder after first engine kill for the 3:1 fuel-to-air ratio, and approximately 4.4 liters of unused fuel were left for the 1.5:1 fuel-to-air ratio. The configuration labeled "4 layer wick" included wicking material in the configuration shown in FIG. 3B, and in FIG. 2C. For this configuration, approximately 4.4 liters of unused fuel were left in the bladder after first engine kill for the 3:1 fuel-to-air ratio, and approximately 4.0 liters of unused fuel were left for the 1.5:1 fuel-to-air ratio.

Thus, for a fuel bladder at +10° roll orientation, the presence of the wicking material decreased the amount of unused fuel by up to approximately 2.5 liters, depending on the configuration of the wicking material and/or the fuel-to-air ratio. NF-900 Saran-Fabric available from Asahi-Kasei of New York, N.Y., USA, was used for all embodiments.

Based on the data shown in FIGS. 7 and 8, and discussed above, it is estimated that the addition of the wicking material to the fuel pickup tube can result in approximately a 3 liter to 6 liter reduction in the amount of unused fuel in the fuel bladder for a bladder having a capacity of 36 Liters. It is expected that this reduction in unused fuel may result in an increase in the engine run times for aircraft. For example, for a Shadow® UAV available from AAI Corporation of Cockeysville, Md., USA, having a fuel consumption rate of 6 Liters per hour, extracting an extra 3 to 6 Liters of fuel from the fuel bladder can result in a flight time increase of approximately ½ to one hour.

The exemplary embodiments illustrated and discussed in this specification are intended to teach those skilled in the art how to make and use the invention, including the best way known to the inventors. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. An aircraft fuel system, comprising:

a fuel container;

a fuel pickup tube located in the fuel container, the fuel pickup tube defining a length and an outer circumference; and a wicking material surrounding at least a portion of the outer circumference of the fuel pickup tube, wherein the wicking material defines a plurality of tabs spaced intermittently along the length of the fuel pickup tube.

2. The aircraft fuel system of claim 1, wherein the fuel pickup tube includes a plurality of holes for receiving fuel from inside the fuel container, and the wicking material is wrapped around the fuel pickup tube and envelopes each of the plurality of holes.

3. The aircraft fuel system of claim 2, wherein the wicking material is wrapped around the fuel pickup tube in multiple layers.

4. The aircraft fuel system of claim 1, wherein the plurality of tabs extend radially from the outer circumference of the fuel pickup tube.

5. The aircraft fuel system of claim 1, wherein the wicking material comprises a saran-based fabric.

6. The aircraft fuel system of claim 1, wherein the wicking material comprises a microporous molecular structure.

7. The aircraft fuel system of claim 1, wherein the fuel container comprises a flexible bladder.

8. The aircraft fuel system of claim 1, wherein the fuel container is substantially rigid.

9. The aircraft fuel system of claim 1, wherein the wicking material is formed in the shape of a bag.

10. The aircraft fuel system of claim 1, wherein the wicking material defines five tabs spaced intermittently along the length of the fuel pickup tube.

11. The aircraft fuel system of claim 1, wherein the wicking material comprises between two and four layers of material wrapped around the fuel pickup tube.

12. An aircraft fuel system, comprising:

an aircraft wing defining a hollow interior;

a fuel container located in the hollow interior;

a fuel pickup tube located in the fuel container, the fuel pickup tube defining a length and an outer circumference; and a wicking material surrounding at least a portion of the outer circumference of the fuel pickup tube, wherein the wicking material defines a plurality of tabs spaced intermittently along the length of the fuel pickup tube.

13. The aircraft fuel system of claim 12, wherein the fuel pickup tube includes at least one hole for receiving fuel, wherein the wicking material is wrapped around the outer circumference of the fuel pickup tube and envelopes the at least one hole.

14. The aircraft fuel system of claim 12, wherein the tabs extend radially from the outer circumference of the fuel pickup tube along the length of the fuel pickup tube.

15. The aircraft fuel system of claim 12, wherein the wicking material comprises a saran-based fabric.

16. The aircraft fuel system of claim 12, wherein the wicking material comprises a microporous molecular structure.

17. The aircraft fuel system of claim 12, wherein the wicking material defines five tabs spaced intermittently along the length of the fuel pickup tube.

18. The aircraft fuel system of claim 12, wherein the wicking material comprises between two and four layers of material wrapped around the fuel pickup tube.

* * * * *